United States Patent [19]

Arnason

[11] 4,367,192

[45] Jan. 4, 1983

[54] IN-MOLD COATING OF SHEET MOLDING COMPOUND MOLDINGS

[75] Inventor: Sigurdur I. Arnason, Fenwick, Mich.

[73] Assignee: The General Tire & Rubber Company, Akron, Ohio

[21] Appl. No.: 260,233

[22] Filed: May 4, 1981

Related U.S. Application Data

[63] Continuation of Ser. No. 48,304, Jun. 13, 1979, abandoned, which is a continuation of Ser. No. 897,980, Apr. 20, 1978, abandoned, which is a continuation-in-part of Ser. No. 814,502, Jul. 11, 1977, abandoned.

[51] Int. Cl.³ .................. B29D 3/02; B29G 3/00; B29G 5/00
[52] U.S. Cl. .................. 264/255; 264/300; 264/328.2; 264/337
[58] Field of Search .............. 264/300, 337, 255, 137, 264/328.1, 328.2

[56] References Cited

U.S. PATENT DOCUMENTS

| | | | |
|---|---|---|---|
| 3,066,112 | 11/1962 | Bowen | 260/23.5 R |
| 3,179,623 | 4/1965 | Bowen | 528/205 |
| 3,301,743 | 1/1967 | Fekete et al. | 528/107 |
| 3,466,259 | 9/1969 | Jernigan | 525/530 |
| 3,548,030 | 12/1970 | Jernigan | 525/502 |
| 3,564,074 | 2/1971 | Swisher et al. | 525/502 |
| 3,674,893 | 7/1972 | Nowak et al. | 525/92 |
| 3,683,045 | 8/1972 | Baldwin | 525/502 |
| 3,836,600 | 9/1974 | Brewbaker et al. | 525/89 |
| 3,892,819 | 7/1975 | Najvar | 260/42.28 |
| 3,940,468 | 2/1976 | Tunstall | 264/46.6 |
| 4,081,578 | 3/1978 | Van Essen et al. | 264/296 |
| 4,100,221 | 7/1978 | Passalenti et al. | 260/42.28 |

FOREIGN PATENT DOCUMENTS 49-26332  3/1974  Japan ................ 260/42.28

OTHER PUBLICATIONS

Randolph et al., Plastics Eng. Handbook, Reinhold, N.Y., (1960), pp. 50, 451 & 452.

Whittington, "Whittington's Dictionary of Plastics," Technomic Pub. Co., Stamford, (1975), p. 173.

*Primary Examiner*—Willard E. Hoag

[57] ABSTRACT

Liquid compositions suitable for hot post-mold coating of cured sheet molding compound (SMC) parts comprise a reaction product of an epoxide and an unsaturated carboxylic acid mixed with a low shrink additive and a filler having a sheet-like structure. These liquid compositions are used to smooth surfaces, fill porosity and other voids and to eliminate or reduce sink marks. Coatings typically are cured in less than two minutes and appear able to provide many features of normal painting without paint facilities except possibly those needed for touch-up.

The application method used to date has been to compression mold an SMC part in the usual way, separate the mold halves, inject the liquid composition and reclose the mold for a second cure cycle. A unique feature of the liquid composition is its ability to adhere to an uncleaned SMC molding.

3 Claims, No Drawings

IN-MOLD COATING OF SHEET MOLDING COMPOUND MOLDINGS

BACKGROUND OF THE INVENTION

Cross-References To Related Applications

This is a continuation of application Ser. No. 048,304 filed June 13, 1979 which in turn is a continuation of Ser. No. 897,980 filed Apr. 20, 1978, which in turn is a continuation-in-part of Ser. No. 814,502 filed July 11, 1977 all now abandoned.

The present invention relates to an in-mold coating process for applying coatings to moldings made of sheet molding compounds.

DESCRIPTION OF THE PRIOR ART

SMC (Sheet Molding Compound) is widely used for high-volume moldings of large, rigid parts. Factors favoring this use have been fast cure and easy flow of the SMC, high strength and stiffness, smoothness, low shrinkage, dimensional stability, and relatively low cost. However, still further improvement in surface quality for exterior automotive parts is a major need.

Particularly troublesome are surface porosity, waviness and sinks. None of these are effectively filled or masked by normal painting operations. Therefore, it is customary to inspect all parts and recycle defective ones through handfilling, sanding, painting and inspection stations until acceptable appearance is obtained. Where no sink can be tolerated, it is common to mold a separate part to act as a skin and bond to it a second part with stiffening and fastening sections.

Other approaches have been to mold a gel coat on parts to hide substrate flaws. In principle, this is done either by coating the hot mold before a charge is molded, see U.S. Pat. No. 3,940,468 (copy enclosed), or by molding a gel coat on a previously molded part, see Japanese application No. 34210/62 (partial translated copy enclosed).

None of the above described methods of gel coating other than the urethane, appears to have received significant testing in hot matched metal SMC molding for a variety of reasons. Probably, the major technical obstacle has been lack of coatings which adhere to SMC other than through co-cure. Thus, where such coatings are applied first, the coating must be cured enough to resist tear during flow of the SMC but still be undercured enough to cross-link with the SMC. Similarly, when the SMC is molded first, it is necessary to open the mold before the SMC is fully cured, which is generally impractical since thin sections of parts are cured long before thick sections are adequately hardened.

One way around the problems described has been the use of resin impregnated foils in place of gel coatings. Another method has been use of unimpregnated foils which act as a tie-coat into whose opposite sides first SMC and later a gel coat can bite. The outstanding benefit with both methods is the ability to obtain surfaces with printed patterns. However, the utility is limited by folding or tearing of foil on many nonflat parts.

Another method has been to bond the in-mold coat to the substrate through isocyanate reactivity using a two component in-mold coat. The two part systems require mixing control, see U.S. Pat. No. 4,081,578. The patent also discloses the use of talc in the in-mold coating composition.

SUMMARY OF THE INVENTION

In view of the above difficulties, liquid compositions were sought which could be molded on and which would adhere to cured SMC parts. As a result of this work, coatings were found which could be molded onto SMC parts. The coating process used is to conventionally compression mold an SMC part, separating the mold half, retaining a seal between the shear edge formed by the upper sides of the mold extending below the upper edge of the top of the lower mold half. An in-mold coating is then injected and the mold is closed to flow and cure the coating. The coatings injected do not require mixing of reactive components at the time of or immediately prior to the time of injection. The coatings of the present invention are also cheaper than the prior art isocyanate coatings. The coatings can also be applied to cured SMC parts, and acceptable cross-hatch adhesions obtained.

In order to obtain coatings having the physical properties desired by the automobile manufacturers without the disadvantages of the prior art coating compositions, a mixture of two resin components, generally in a vinyl monomer solvent and a filler having a plate-like structure are used.

It was unexpectedly found that a silicate filler having a sheet-like structure gave an unexpected improvement in cross-hatch adhesion. Cross-hatch adhesion means that the coating stays on the substrate after a cross-hatch pattern is cut into the coating and then adhesive tape applied to the cut surface and pulled away. If 80% of the coating remains on the substrate after this treatment, it is said to have good cross-hatch adhesion. One theory is that the sheet-like structure of the filler reduces the cohesion of the coating to the point where adhesion failure is secondary. Also the coating has such poor cohesion that it will break before it can be pulled off as a sheet.

The silicas or silicates having a sheet structure are described in Kirk-Othmer Encyclopedia of Chemical Technology, Second Edition, Vol. 18, p. 49, Interscience Publishers, New York, N.Y. (1969).

The filler having a sheet-like structure can be selected from the silicate groups comprising talcs and micas. The aspect ratio, length to thickness has a minimum value of 4 and a maximum value of 10,000. The aspect ratio is preferably 10 to 1,000. The particle length of the fillers having a sheet-like structure can range from 0.001 mm to 0.4 mm preferably 0.01 mm to 0.4 mm.

The Canadian talcs are the preferred talcs as they have a lesser tendency to soak up the resin component of the sheet molding compound. For a harder coating, mica fillers are preferred.

The first resin component is a vinyl ester resin. Another component is a material which is incompatible with the vinyl ester resin. Materials commonly used as low shrink additives meet this requirement. It is believed that the low shrink additive further weakens the tensile strength of the coating so it cannot be pulled off in one piece or transmit forces. Based on 100 parts of vinyl ester resin, the low shrink additive is present at a level of from 10 to 50 parts, preferably from 20 to 40 parts by weight. Both the vinyl ester and the low shrink additive are normally dissolved in styrene. The low shrink additive also reduces the shrinkage which the in-mold coating undergoes during cure.

Vinyl ester resins are generally prepared by reacting about equivalent proportions of a polyepoxide resin and an unsaturated monocarboxylic acid wherein

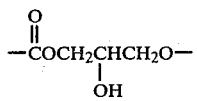

linkages are formed and the resulting resin has terminal, polymerizable unsaturated groups. For example, two equivalents of methacrylic acid may be reacted with two equivalents of a polyepoxide resin to produce a vinyl ester resin. The preferred vinyl ester resins are those containing an average of from 0 to 1 free carboxylic group per molecule. A free carboxyl group is a carboxylic acid group or an ionized carboxyl group having a negative charge.

Vinyl ester resins are described in U.S. Pat. No. 3,367,992 to Bearden wherein dicarboxylic acid half esters of hydroxyalkyl acrylates or methacrylates are reacted with polyepoxide resins. Bowen, in U.S. Pat. Nos. 3,066,112 and 3,179,623 describes the preparation of vinyl ester resins from monocarboxylic acids such as acrylic and methacrylic acid. Bowen also describes an alternate method of preparation wherein a glycidyl methacrylate or acrylate is reacted with the sodium salt of a dihydric phenol such as bisphenol A. Vinyl ester resins based on epoxy novolak resins are described in U.S. Pat. No. 3,301,743 to Fekete et al. Fekete et al also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan and the like, may be utilized in place of the dicarboxylic acid. All of the above-described resins which contain the characteristic linkages

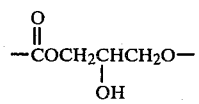

and terminal, polymerizable unsaturated groups are classified herein as vinyl ester resins. The preparation of vinyl ester resins is fully disclosed in the above patents.

Additionally, but not preferably it is meant to include within the definition of vinyl ester resins those resins wherein the secondary hydroxyl group formed by the interaction of an epoxide group with a carboxylic acid group has been reacted with a dicarboxylic acid anhydride to produce pendant carboxylic acid groups. The preparation of these materials is described in U.S. Pat. No. 3,466,259 to Jernigan. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl. A reaction temperature from about 25° to 150° C. is suitable and any of the well known vinyl polymerization inhibitors may be added to prevent polymerization during the reaction.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolaks, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2,000. These polyepoxides are usually made by reacting at least about 2 moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than 1.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from 2 to 6 carbon atoms.

Useful dicarboxylic acid anhydrides to modify the vinyl ester resin include unsaturated anhydrides such as maleic anhydride, citraconic anhydride, itaconic anhydride, the various substituted maleic anhydrides and the like, as well as a variety of saturated anhydrides such as phthalic anhydride, chlorendic anhydride, tetrabromophthalic anhydride and the like.

A variety of copolymerizable monomers are available and suitable and include alkenyl aromatic monomers, alkyl esters of acrylic and methacrylic acid, vinyl acetate, acrylonitrile, diallyl maleate, diallyl phthalate, acrylic and methacrylic acid, and the like and mixtures thereof. Preferred are the alkenyl aromatic monomers such as styrene, α-methyl styrene, vinyl toluene, alkyl substituted styrenes such as t-butyl styrene, etc., halogen substituted styrenes such as chlorostyrene, dichlorostyrene and the like.

The preferred low shrink additive or film weakening additive is polyvinyl acetate. Polyvinyl acetate copolymers can also be used.

The thermoplastic polymers of vinyl acetate suitable for purposes of this invention contain an average of 0 to about 10 and preferably an average of 0 to about 3 carboxyl groups per molecule. On a weight basis, suitable thermoplastic polymers contain about 0 to about 5% by weight, preferably about 0 to about 2% by weight combined "carboxyl" compound. These polymers can be prepared in a number of ways, all well known in the art, by:

(1) Polymerizing vinyl acetate with a copolymerizable carboxylic acid to produce a copolymer having an average of at least one carboxyl group per molecule. Suitable copolymerizable carboxylic acids are the unsaturated polycarboxylic acids previously described as well as unsaturated monocarboxylic acids having the formula:

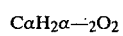

wherein $a$ is an integer having a value of 3 to 10 inclusive, preferably 3 to 6 inclusive. Exemplary of acids falling within the scope of the above are the following: acrylic acid, methacrylic acid, crotonic acid, isocrotonic acid, vinyl acetic acid, tiglic acid, hexenic acid, and the like.

(2) Reacting poly(vinyl acetate) with a copolymerizable carboxylic acid, such as the acids described in (1) above to form a block copolymer or a grafted copolymer.

(3) Partially hydrolyzing poly(vinyl acetate) generally to a maximum value of 20% based on the total number of ester groups originally present and partially or totally esterifying the hydroxyl groups with a polycarboxylic acid or anhydride thereof as previously described in this specification.

(4) Preferably the vinyl acetate is a homopolymer. In formulating the compositions of this invention, it is customary to admix with the polymers of vinyl acetate, a polymerizable ethylenically unsaturated monomer, which serves to cross-link the vinyl ester resin to a thermoset product. Vinyl monomers have the formula:

$$CH_2=CH-R$$

wherein R is a group having an unsaturated carbon-to-carbon, carbon-to-oxygen or carbon-to-nitrogen group in conjugation with the vinyl group. Groups having such unsaturation in conjugation with the vinyl group are aryl, ketonic, heterocyclic, nitrile, carbalkyxy, carboxy and amido. Specific vinyl monomers include the following:

wherein R is aryl: styrene, halogenated styrenes such as chlorostyrene, p-iodostyrene, m-fluorostyrene, dichlorostyrene and the like; alkyl substituted styrenes such as p-methyl styrene, p-ethyl styrene, o-tertbutyl styrene and the like; alkoxy and aryloxy substituted styrenes such as p-ethoxy styrene, p-propoxy styrene, p-phenoxy styrene and the like;

wherein R is ketonic: ethyl vinyl ketone, n-propyl vinyl ketone, phenyl vinyl ketone and the like;

wherein R is heterocyclic: vinyl pyridine, vinyl quinoline, vinyl pyrrole, vinyl carbazole, vinyl thiophene and the like;

wherein R is nitrile: acrylonitrile and the like;

wherein R is amido: acrylamide, bicycloheptylacrylamide, diacetoneacrylamide and the like;

wherein R is carboxy: acrylic acid and the like;

wherein R is carbalkoxy: methyl acrylate, butyl acrylate, octyl acrylate, aluryl acrylate, cyclohexyl acrylate, phenyl acrylate, benzyl acrylate and the like.

Also suitable is diallylphthalate and the like.

The amount of ethylenically unsaturated monomer used can vary over wide limits. For example, the monomer can be used in amounts of about 10 to about 60% by weight based on the combined weight of the monomer and the polyvinyl acetate. It is preferred to use about 20 to about 50% by weight ethylenically unsaturated monomer, based on the combined weight of the monomer and polyvinyl acetate. The same unsaturated monomers can be used as solvents for the other low shrink additives and the vinyl ester resin. The unsaturated monomer is usually present at a level of from 50 to 400 parts and preferably 100 to 200 parts based upon 100 parts of vinyl ester resin. Preferably from 1 to 3 equivalents of vinyl monomer per equivalent of vinyl ester unsaturation are present.

Other preferred low shrink additive includes the polydiene rubbers. By polydiene rubbers it is meant to include herein homopolymers and copolymers of conjugated diene monomers such as butadiene. It is further contemplated within this definition to include polymers containing at least about 30 weight percent of diene monomer with the balance comprising at least one other copolymerizable monomer such as styrene or acrylonitrile. It is also meant to include random, graft and block polymers of which a wide variety are commercially available or readily prepared by known polymerization methods.

While polydiene rubbers with as little as 30 weight percent of a diene monomer provide improvements according to this invention, better coating properties are found when the diene monomer constitutes at least about 40 weight percent of the polymer and polymers at or above this level are preferred for this invention.

Conjugated diene monomers include butadiene, isoprene, chloroprene, the various halo and lower alkyl substituted derivatives thereof and the like monomers. Mixtures of said diene monomers are frequently used to impart certain desired properties to the polydiene rubbers. Polybutadiene is a preferred polydiene.

Copolymerizable monomers useful with said diene monomers include nitrile monomers such as acrylonitrile, methacrylonitrile and the like and alkenyl aromatic monomers such as styrene, α-methyl styrene, vinyl toluene, the halo and alkyl substituted styrenes such as chlorostyrene or t-butyl styrene. Preferred copolymers include styrene-butadiene copolymers and especially block copolymers thereof.

The unsaturated polydiene rubbers of this invention may be prepared by a variety of well-known procedures, and since this invention is concerned with the utilization of said rubbers and not their preparation, no detailed description thereof is needed. Many textbooks and patents are readily available which can be consulted for such preparative methods, such as the chapter on butadiene polymers and copolymers by W. Saltman in "Encyclopedia of Polymer Science and Technology", Vol. 2, Interscience Publishers, 1965.

The preferred polydiene rubber has an inherent viscosity of about 0.3 to 1.2 deciliters/gram or a molecular weight of at least about 15,000 to 20,000.

Improvement in coating properties appear to be related to molecular weight of the polydiene rubber. Consequently higher molecular weight polydiene rubbers when used at the lowest concentration shows greater improvement than the lower molecular weights. Accordingly, it is preferred to use polydiene rubbers having a viscosity of at least about 0.5 deciliters/gram.

Advantageously, it has been found that the viscosity range can be extended upward to about 2 deciliters/gram if the system also contains at least about 15 parts of an inert filler such as clay and the like per 100 parts of resin and rubber. This is of particular significance because thermosettable resin systems are usually formulated with such fillers in commercial use in order to impart certain properties such as weatherability, etc. and for reason of economics.

Inherent viscosity is defined as follows:

$$\eta inh = (2.303 \log_{10} \eta r)/(C)$$

where
  $\eta r = (\eta/\eta)$ and
  $\eta$ = time for solvent and
  $\eta$ = time for a solution of 0.15 gm of polymer/100 ml of toluene
  C = concentration
The viscosity unites are in deciliters/gram Other low shrink additives which can be used include polymethylmethacrylate, polyethylene and polystyrene.

In addition to the vinyl ester resin, an unsaturated polyester resin can optionally be present. The polyester is present at a level of from 0 to 100 parts of vinyl ester resin by weight.

Generally, in the preparation of suitable polyesters, an ethylenically unsaturated dicarboxylic acid such as maleic acid, fumaric acid, itaconic acid or the like, is interesterified with an alkylene glycol or polyalkylene glycol having a molecular weight of about 1,000 to 8,000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25% and usually is about 2–10%.

These unsaturated polyesters may be generally prepared by heating a catalyzed mixture of the polyhydric alcohol with the dicarboxylic acid or anhydride in the proper molar proportions at elevated temperatures, usually at about 150° to 225° C. for a period of time ranging from about 5 to 15 hours. Polymerization inhibitors such as t-butyl catechol may be advantageously added. It is also possible to prepare unsaturated polyesters directly from the appropriate oxide by copolymerization with an anhydride, e.g., propylene oxide can be used in place of propylene glycol and copolymerized with maleic anhydride or a mixture of maleic anhydride and phthalic anhydride. Further description of these well-known resins is unnecessary herein.

Normally, the gel coating composition of the present invention are dissolved or suspended in a vinyl monomer such as those described above in conjunction with the vinyl acetate. The vinyl monomer can be present at a level of from 10 to 200 and preferably 50 to 150 parts based upon 100 parts by weight of vinyl ester.

The usual emulsifier inhibitors and fillers can also be present, see U.S. Pat. Nos. 3,466,259; 3,548,030; 3,564,074; 3,674,893; 3,836,600 and 3,683,045 for a complete disclosure of the above materials. It is preferred however that the usual fillers constitute less than 50% of the normal fillers loading and that the fillers of the present invention having a sheet type structure constitute the major or total filler content.

The preferred SMC's used in the practice of the present invention as substrates for in-mold coating are those based on vinyl ester, isophthalic and propylene glycol fumarate polyester systems.

Chrome-plated, shear edge molds suitable for compression molding SMC adequately contain and release in-mold coated parts. Ordinarily, molds are used whose surfaces part evenly when the press is opened. Furthermore, it must be noted that coating thickness varies with draft angle of substrate surface; thicknesses typically run from about 0.01 mm on low draft surfaces to 0.07 mm on high draft surfaces. This occurs because the mold opening available for coating when measured perpendicular to the part surface varies with the sine of the draft angle.

As mentioned earlier, the principle method used so far to apply the coating is to slightly separate the mold halves, inject into an area formed by a high draft surface onto the SMC part and then reclose the mold. This method allows a shear edge design to form a liquid seal at all times.

The best mode found for injecting the coating is by using an injection nozzle which has a pin protruding through the opening in the nozzle. In the closed position the end of the pin forms a small portion of the inner mold surface. In the open position the pin is pulled back from the mold and from the opening in the nozzle allowing coating material to be injected into the mold. The pin is stabilized against rotation so that it will always form a smooth surface with the mold wall in the closed position. The nozzle is thermally insulated from the mold and is water cooled.

Charge weights giving as much as 0.05 mm of coating have been used, but an average of 0.07 to 0.10 mm of coating has generally been enough to give both opacity and complete coverage. Since the usual SMC part averages 2.5 mm in thickness, a typical coating has required about 0.03 to 0.05 gm of coating per gm of SMC used.

Simple coating charge placements, often a single pool or strip formed by high pressure injection usually have provided complete coverage.

Mold temperatures from 140° to 160° C. have given satisfactory coatings. A minimum cure time of 10 to 30 seconds at 150° C. has been used and even slower cure rates have sometimes been required to prevent too rapid gelation and resulting in incomplete coverage.

Higher molding pressures, as expected, provide better coverage of steeper, lower draft surfaces. However, the typical pressures needed to mold the base SMC part have also generally been adequate to give a complete coating.

The principle aim of gel coating has been to fill voids, reduce sinks and act as a replacement for the primer-sealer now commonly used by custom molders of SMC.

In-mold coated parts have passed the automotive tests normally used except for some humidity, water immersion, adhesion and gravel ometer tests of painted panel. The Ford Cross-Hatch Tests showed better results than similar in-mold coating compositions filled with calcium carbonate.

Although work has been directed among other things at replacing a priming operation, in some instances priming is still necessary to pass the necessary tests. Coatings have also been made which appear suitable as pigmented topcoats, at least insofar as hiding power goes, priming or painting.

Also coatings with good conductivity and adhesion have been made by inclusion of graphite having a sheet structure, though consistant reproduceability is questioned. As this indicates, there is considerable flexibility in choice of ingredients and resulting coating properties.

In the following examples as elsewhere in the specification and claims, all parts and percentages are by weight unless otherwise specified.

EXAMPLE I

A 1973 Oldsmobile grill opening panel was molded using a standard Rohm and Haas unsaturated polyester based sheet molding compound.

The press used was manufactured by Erie Press in Erie, Pa. using 68.95 KPa pressure (1,000 psi). All the presses made by the various manufacturers have automatic degas controls or they can be added.

The automatic degas cycle of the press was activated to control the sequence necessary for molding the parts, opening the mold to inject the in-mold coat and reclose on the proper pressure to coat the parts. The parts were molded and were excellent in appearance. They were tested and passed all the tests run. The coating was so thick that a cross-hatch adhesive could not be run. The coating was 2.2 mm thick. The molding sequence was as follows.

All four timers on press were used. Timer #1 (T-1) is the precure timer and was set at 2½ minutes to mold and cure the part. When the cure time has elapsed and the press comes off tonnage T-2 times the flow of oil to return the ram (set at 1-11/12 seconds), this opens the mold to 13 mm. In-mold coating material was then injected into the mold with the timer on the injector being the T-3 times which, in this case, was set at 13 seconds. When T-3 has timed out the press came back down and onto tonnage and was timed out by T-4 (60 seconds) to cure the coating.

This whole sequence worked very well for molding and coating parts and the press repeated the same sequence correctly every time except T-2 which appeared to be off by 3 mm either way once in a while. This is understandable as break-away force needed can and will fluctuate with fluctuations in charge weight and charge placement when shears are as wide open as on this part.

With this setup precure pressure and cure pressure were different to hide sinks over bosses and ribs. Mold cure pressure was reduced to 78740 Kg/area of front end (100 tons/area front end) less than precure tonnage to reduce the tendency for parts to crack.

An interface signal from T-2 is used to activate the injector and another signal from T-3 is used to shut it off. This eliminates a need for a separate timer for the injector. During injection a seal was maintained with the shear edge of the mold. The following in-mold coating composition was the one injected through a cooled injection nozzle positioned between the parting surfaces of the mold and injecting parallel to the parting surfaces.

The coating composition used had the following formulation

| Components | Parts |
| --- | --- |
| Vinyl ester resin[1] in styrene (believed to be 66% copolymer of acrylic acid and diglycidyl ether of bisphenol A in 44% styrene) | 200 |
| 40% polyvinyl acetate, free of carboxyl groups, dissolved in 60% styrene[2] | 80 |
| Styrene | 40 |
| Canadian talc 0.03mm average particle length | 200 |
| Suzorite mica (phlogopite) 0.03mm average particle length | 140 |
| Tertiary butyl benzoate | 6 |
| Saturated solution of parabenzoquinone in styrene (inhibitor) | 0.6 |
| Dialkyl phosphate[3] (mold release) | 3.0 |

[1] Dow XD 9013.02
[2] Union Carbide LP90
[3] Zelac NE duPont

EXAMPLE II

A series of five formulations were prepared to determine physicals in the laboratory. The formulations contained the same materials as Example I except that the quantities and types of fillers having a sheet type structure were varied.

|  | "A" | % | "B" | % | "C" | % | "D" | % | "E" | % |
| --- | --- | --- | --- | --- | --- | --- | --- | --- | --- | --- |
| Dow 9013.02 | 100 | 20.47 | 100 | 30.08 | 100 | 40.08 | 100 | 34.54 | 100 | 23.01 |
| Union Carbide LP-90 | 40 | 8.19 | 40 | 12.03 | 40 | 16.0 | 40 | 13.82 | 40 | 9.21 |
| Styrene | 15 | 3.07 | 15 | 4.51 | 15 | 6.01 | 15 | 5.18 | 15 | 3.45 |
| T-B-PB | 3 | .61 | 3 | .90 | 3 | 1.20 | 3 | 1.04 | 3 | .69 |
| 6012 Zelec Ne Styrene 50/50 | 1.5 | .31 | 1.5 | .45 | 1.5 | .60 | 1.5 | .52 | 1.5 | .35 |
| Canadian Talc #5 | 329 | 67.3 | — | | — | | — | | 175 | 40.28 |
| Canadian Talc #505 | — | | 173 | 52.03 | — | | 70 | 24.18 | 100 | 23.01 |
| Suzorite (Mica) | — | | — | | 90 | 36.07 | 60 | 20.73 | — | |
| Total | 488.5 | | 332.5 | | 249.5 | | 289.5 | | 434.5 | |

It was determined after preliminary evaluation that formula "B" had the best adhesion, formulas "A", "C", "D" and "E" had unacceptable adhesion and formulas "D" and "E" has better adhesion than "A" and "C", but not as good as "B".

The following are the processing parameters and test results of formula "B":

| | |
| --- | --- |
| Mol Temperature | 295° F./300° F. |
| SMC Cure Time | 2 mins. = 3 min. |
| Coating Cure Time | 1 min. total time |
| Coating Thickness | .23mm |
| Gravelometer | difficult to determine on unpainted samples, appears to be about 6 |
| Pencil Hardness | F |
| Scribe X | Good |
| Cross-Hatch | Good |
| Adhesion to raw panel | substrate and coating appear to have a mechanical lock rather than a chemical bond, when coating is scraped off of the substrate the surface still has a shiny appearance |

The 0.23 mm coating was the minimum thickness that could be used and still cover the 16"×16" flat sheet adequately. The #5 talc contains more calcium carbonate than the #505 talc.

| #5 TALC (CANADIAN) | | |
|---|---|---|
| | | Percent |
| Typical Chemical Analysis | | |
| Silica | $SiO_2$ | 16-25 |
| Calcium Oxide | CaO | 15-30 |
| Aluminum Oxide | $Al_2O_3$ | 1-4 |
| Magnesium Oxide | MgO | 20-28 |
| Loss on Ignition | | 15-20 |
| pH | | 9.5-10.5 |
| Typical Physical Properties | | |
| Dry Brightness | | 84-89 |
| Specific Gravity | | 2.80 |
| Tapped Density, lbs./cu. ft | | 76-80 |
| Loose Density, lbs./cu. ft. | | 49-57 |
| Lbs./solid gallon | | 23.32 |
| One Lb. Bulks, gallons | | 0.0429 |
| Oil Absorption | | 20-24 |
| Hegman Fineness | | 1-2 |
| Thru 200 mesh, % | 0.03mm average particle length | 99 |
| Thru 325 mesh, % | | 98 |

| #505 TALC (CANADIAN) | | |
|---|---|---|
| | | Percent |
| Typical Chemical Analysis | | |
| Silica | $SiO_2$ | 38-41 |
| Calcium Oxide | CaO | 11-13 |
| Aluminum Oxide | $Al_2O_3$ | 2-3 |
| Magnesium Oxide | MgO | 25-28 |
| Ferric Oxide | $Fe_2O_3$ | 1-2 |
| Loss on Ignition | | 15-18 |
| pH | | 9-10 |
| Typical Physical Properties | | |
| Dry Brightness | | 87-89 |
| Specific Gravity | | 2.80 |
| Tapped Density, lbs./cu. ft. | | 68-74 |
| Loose Density, lbs./cu. ft. | | 28-34 |
| Lbs./solid gallon | | 23.32 |
| One Lb. Bulks, gallons | | 0.0429 |
| Oil Absorption | | 18-24 |
| Hegman Fineness | | 3.5-5 |
| Thru 200 mesh, % | 0.03mm average particle length | 100 |
| Thru 325 mesh, % | | 97 |

| Properties of Suzorite Mica Flake | |
|---|---|
| Property | Value |
| Color | Amber-brown |
| Shape | Thin flakes |
| Particle nominal diameter | 20 microns to 0.25 inch (0.64 cm), depending on grade |
| Particle thickness | 0.5 to 10 microns, depending on grade |
| Hardness (Mohs) | 2.5 to 3.0 |
| Specific gravity | 2.9 |
| Refractive index | 1.598 |
| pH (of aqueous suspension) | 7.5 |
| Water solubility | Virtually insoluble |
| Maximum temperature with little or no decomposition | 2372° F. (1300° C.) |
| Bulk density (Scott Volumeter) as produced | 9 to 17 lb/ft³ (0.14 to 0.27 g/cm³) |
| as shipped | 20 to 35 lb/ft³ (0.32 to 0.56 g/cm³) |
| Grit content | −325 mesh passes ASTM D-607-42 |
| Modulus of elasticity | $25 \times 10^6$ psi (172 MPa) |
| Tensile strength (calculated)* | $125 \times 10^3$ psi (862 MPa) |
| Thermal conductivity** (perpendicular to cleavage plane) | 4.6 (K factor) |
| Linear coefficient of thermal expansion** (parallel to cleavage plane) | $7.2 \times 10^{-6}/°F.$ ($13 \times 10^{-6}/°C.$) |
| Average particle length | 0.03mm |

*J. Mater, Sci. 8, 1373 (1973)
**U.S. Bu. Mines Bulletin 647

Chemical Composition

The chemical formula of Suzorite Mica Flake is

$K_2MG_{4.32}Fe_{1.16}AL_{38}[Si_{5.75}AL_{2.25}O_{20}](OH)_2F_2$

Its chemical composition, by weight, is presented below.

| Component | Weight % |
|---|---|
| $SiO_2$ | 40.7 |
| $Al_2O_3$ | 15.8 |
| MgO | 20.6 |
| $K_2O$ | 10.0 |
| FeO | 7.8 |
| F | 2.2 |
| $Fe_2O_3$ | 1.2 |
| $H_2O$ | 1.0 |
| BaO | 0.5 |
| $Na_2O$ | trace |
| $TiO_2$ | trace |
| $Cr_2O_3$ | trace |
| MnO | trace |

Panels prepared using formulation "B" of Example II were finished with 3 automotive finishes both primed and unprimed and tested against the respective automotive specifications for finishing applications.

GM (1) One panel was primed with Sherwin-Williams Plane E67BB7 and baked 30 minutes at 82° C. (180° F.).

(2) One panel was not primed. Both of the above panels (1&2) were sealed with PPG 871-571 then wet-on-wet topcoated with duPont 926-97686 white lacquer. The panels were then prebaked 10 minutes at 82° C. (180° F.), and then reflowed 30 minutes at 162° C. (325° F.).

Chrysler (3) One panel was primed with Sherwin-Williams Plane E67BB7 and baked 10 minutes at 82° C. (180° F.).

(4) One panel was not primed. Both of the above panels (3&4) were then topcoated with Celanese 64-1170 HEA Enamel and baked 30 minutes at 121° C. (250° F.).

Ford (5) One panel was primed with Mobil Taupe ESB-M6J-119B and baked 30 minutes at 163° C. (325° F.).

(6) One panel was not primed. Both of the above panels (5&6) were then topcoated with Ford M50J NAD Enamel and baked 16 minutes at 135° C. (275° F.).

All of the panels were tested against their respective specifications. The results of the testing are listed below.

| Panel No. | 1 | 2 | 3 | 4 | 5 | 6 |
|---|---|---|---|---|---|---|
| System | GM | GM | Chry. | Chry. | Ford | Ford |
| Adhesion | Pass | Pass | Fail | Pass | Fail | Pass |
| Gravelometer (0° F. 70 psi) | 8 (Pass) | 6 (Fail) | — | — | 6 | 6 |
| Humidity (96 hrs, 100° F., 100% RH) | Pass | Pass | — | — | — | — |
| Humidity (250 hrs. 100° F., 100% RH) | — | — | Fail* | Pass | — | — |
| Water Immersion (240 hrs, 90° F.) | — | — | — | — | Pass | Fail# |
| Gardner Impact (80 in.-lb.) | — | — | Pass | Pass | — | — |
| Salt Spray (250 hrs) | — | — | Pass | Pass | — | — |

*interlaminar failure of the in-mold coating. May have been caused by tension in removing part from mold causing interlaminar failure. (The usual cause of this type of failure)
topcoat/in-mold coating interface adhesion failure

I claim:

1. In a method coating, resulting in improved cross hatch adhesion, a rigid part made from sheet molding compound after the part is molded between two hot chrome plated metal mold halves under pressure and cured to a rigid enough state so that the part will not change configuration on separation of the two mold halves while the mold is maintained in a sealed condition, said coating composition comprising styrene, a vinyl ester resin formed by the reaction of an epoxy based resin and an unsaturated monocarboxylic acid, a mold release agent which prevents the coating composition from adhering to the two chrome plated mold halves, and a low shrink additive, the improvement wherein said coating composition comprises: 20% of said vinyl ester resin, 5% vinyl acetate resin, 22% styrene and 52% talc, the above percentages being approximate and by weight and said talc having an average particle size of approximately 0.03 mm.

2. The method of claim 1 wherein talc has have a particle length of 0.001 mm to 0.4 mm and a minimum aspect ratio of 4.

3. The method of claim 1 wherein the silicates have an aspect ratio of from 10 to 10,000 and a particle length of 0.01 mm to 0.4 mm.

* * * * *

UNITED STATES PATENT AND TRADEMARK OFFICE
CERTIFICATE OF CORRECTION

PATENT NO. : 4,367,192
DATED : January 4, 1983
INVENTOR(S) : Sigurdur I. Arnason It is certified that error appears in the above-identified patent and that said Letters Patent are hereby corrected as shown below:

In column 14, line 1, which reads "method coating", insert ---of--- after "method".

In column 14, line 19, which reads "talc has have", should read --the talc has--.

Signed and Sealed this

Third Day of May 1983

[SEAL]

Attest:

GERALD J. MOSSINGHOFF

Attesting Officer

Commissioner of Patents and Trademarks